FIG. 2
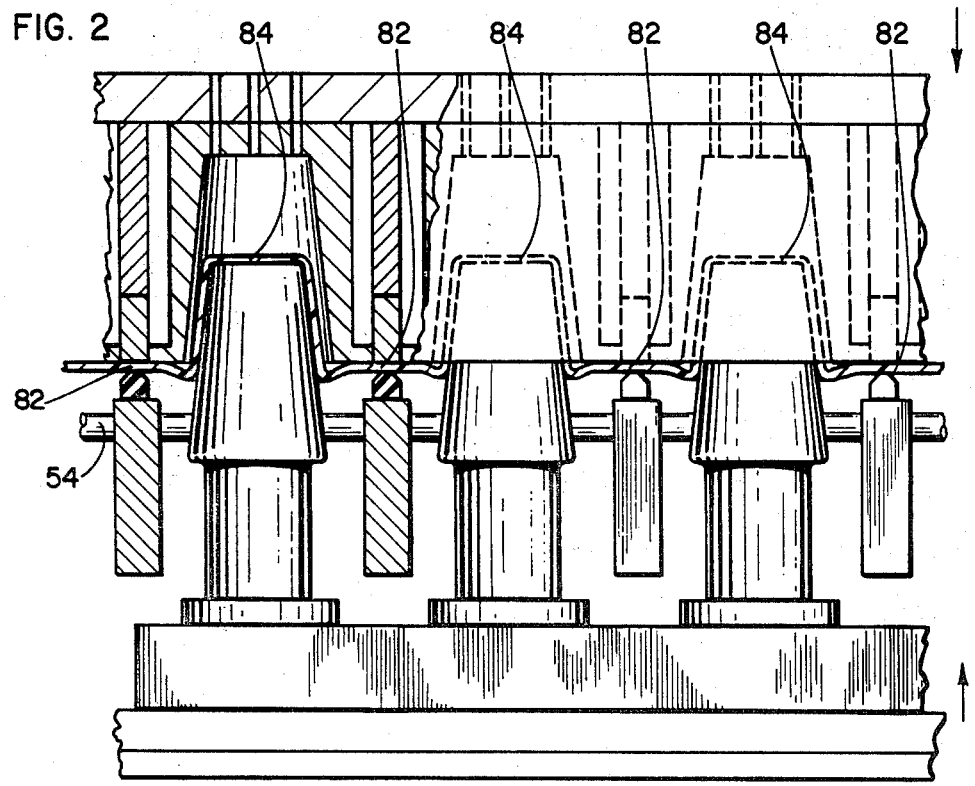
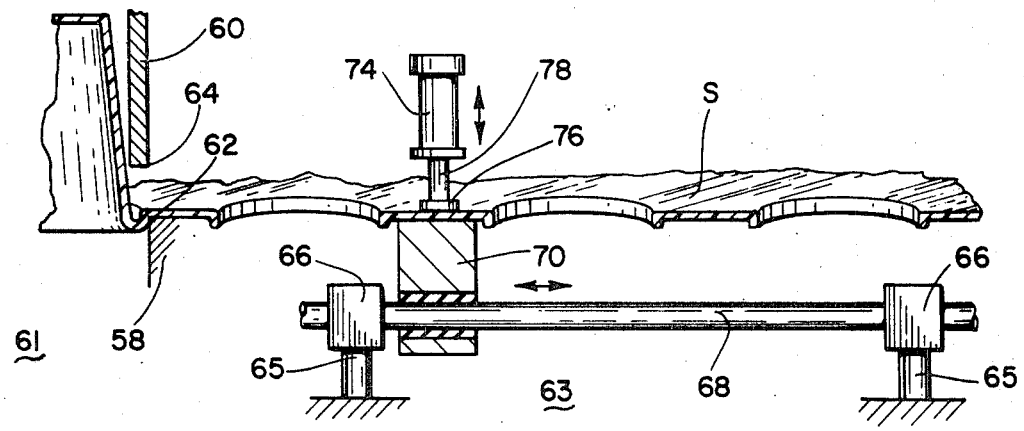
FIG. 4
INVENTOR.
ROBERT H. PETERS
SIDNEY CHOLMAR

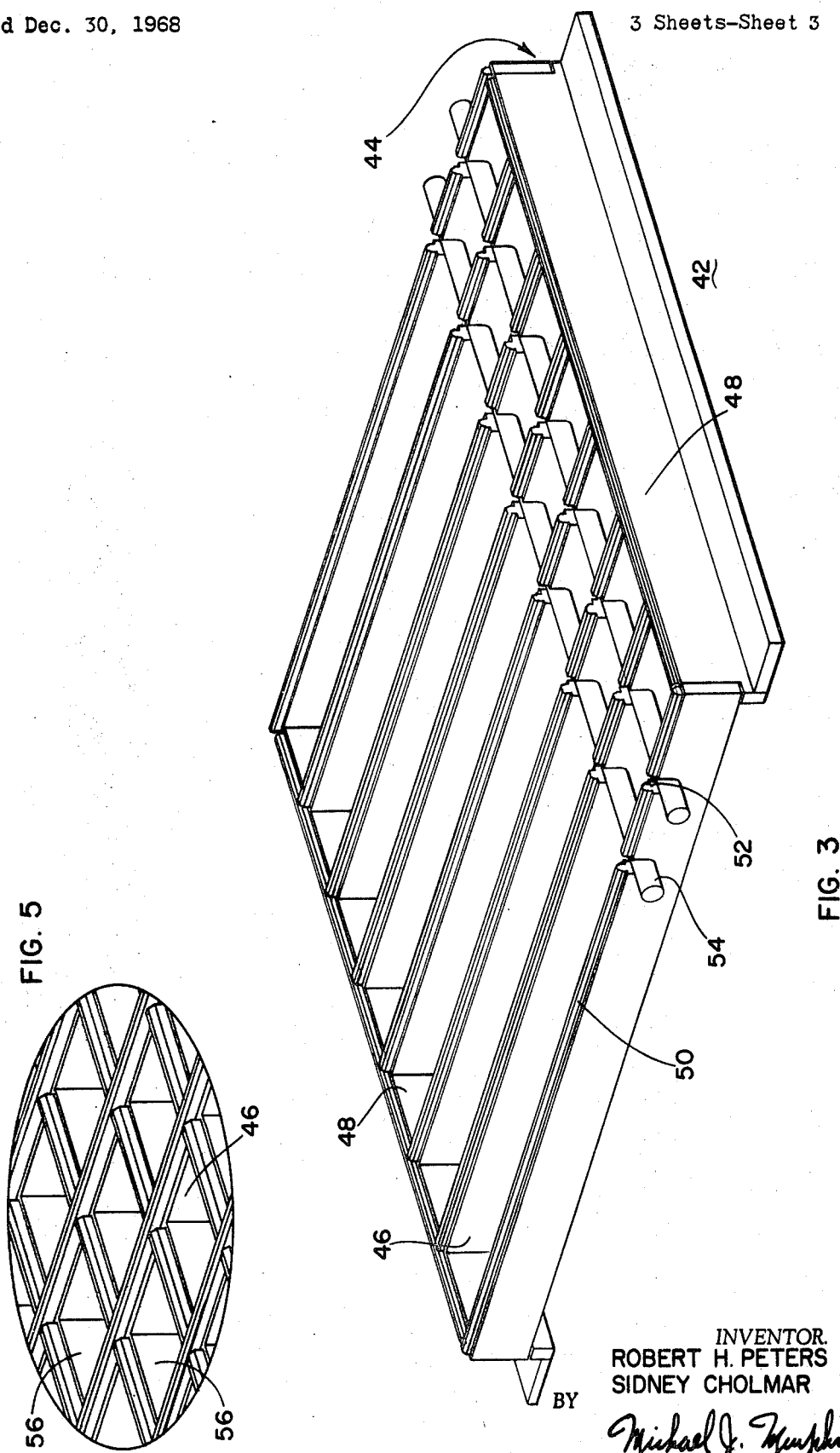

United States Patent Office 3,578,735
Patented May 11, 1971

3,578,735
METHOD AND APPARATUS FOR MOLDING PLASTIC ARTICLES
Sidney Cholmar and Robert H. Peters, Bloomfield, Conn., assignors to Monsanto Company, St. Louis, Mo.
Filed Dec. 30, 1968, Ser. No. 787,654
Int. Cl. B29c 17/03, 17/04
U.S. Cl. 264—89                                6 Claims

ABSTRACT OF THE DISCLOSURE

Method and apparatus for simultaneously forming a plurality of articles from thermoplastic sheet material. The sheet from which the articles are formed is clamped against a mold containing rows of mold cavities. The clamping is within the periphery of the sheet solely in a direction perpendicular to that of advancement of the sheet such that it is uninterrupted across the sheet intermediate each row of cavities. The clamping member has a reciprocatably mounted frame having laterally extending ribs joined to sides of the frame. The ribs are aligned opposite a front face of the mold between the rows of cavities therein.

---

The present invention is directed toward a method and apparatus for forming plastic articles and more particularly to a method and apparatus for forming articles from a heated sheet of thermoplastic material.

In the high speed, large scale production operations of recent years, molding machines have been developed to form a plurality of articles from a heated thermoplastic sheet during a single cycle of the forming equipment by forcing portions of the sheet into plural cavities of a mold. In these systems the full sheet portion from which the plural articles are to be formed in a given cycle is usually clamped around its periphery to avoid pulling the entire sheet into the cavities during forming. However, plural containers formed from a peripherally clamped sheet have been found to have undesirable variations in material distribution when compared to each other. This is a result of the hot sheet being unrestrained within its periphery and thereby free to move in numerous directions depending on the condition of the sheet or the surface temperature of advancing plugs which draw the sheet into the cavities during the initial stage of the forming process. For example, if one sheet portion or plug surface for forming a particular container is not as hot as that for forming another container, material is unevenly drawn from this latter higher temperature area into the mold of the former container, thus undesirably resulting in one rather thin walled article and one thicker walled article. The problem is especially aggravated when the articles are deep containers wherein the plastic is drawn a rather substantial distance into the mold cavities.

When the equipment is operated as a continuous or semi-continuous line wherein successive portions of a sheet are heated, fed to a forming and cooling station and then advanced to a trimming station where the articles are separated from the sheet, a further problem results. The drawing plugs in the forming station which are adjacent the sheet portion which is in or has just passed through the heating oven tend to unevenly pull material out of this just heated section of the sheet into the adjoining portion of the continuous sheet in the forming station. Thus, when this thinned sheet portion is subsequently advanced into the forming station, articles formed therefrom will have thin walls in comparison with articles formed from other portions of the sheet. The area contact of the peripherally extending clamp with the sheet is usually not sufficient to prevent this thinning action. Furthermore, the uneven space between succeeding portions of the continuous sheet in which the containers are formed results in malfunctioning of automated downstream equipment for gripping the containers which are still attached to the sheet and advancing them into a trimming station, the articles being frequently crushed by fingers designed to grasp the articles, or mistrimmed due to misaligned registry within the trimming station.

Now there has been developed a method and apparatus for confining a hot sheet portion in a thermoforming station which overcomes the prior art difficulties discussed above.

Accordingly, it is an object of the present invention to provide a method and apparatus for forming plural articles at a low initial cost which have improved uniformity of material distribution therein when compared one to the other.

It is an additional object of this invention to provide an improved method and apparatus for simultaneously forming a plurality of plastic articles from a sheet of thermoplastic material.

Another object of this invention is to provide an improved method and apparatus for repeatedly simultaneously forming a plurality of articles from a generally continuous thermoplastic sheet.

A further object of this invention is to provide an improved clamp in a thermoforming apparatus.

Another object of this invention is to provide a method and apparatus for sealing a web of thermoplastic material to the face of a multicavity mold at plural locations between the cavities.

A still further object of this invention is to provide a method and apparatus for overcoming the prior art difficulties discussed above.

These and other objects will in part be obvious and will in part appear hereinafter.

These and other objects are accomplished by providing in a method of simultaneously forming a plurality of thermoplastic articles by aligning a thermoplastic sheet opposite plural article forming cavities of a mold, clamping and heating the sheet to molding temperature and forcing portions of the heated and clamped sheet into the cavities to simultaneously form the plurality of articles, the improvement which comprises clamping the thermoplastic sheet within its periphery along plural areas between the cavities of the mold so that each article is formed essentially completely from a portion of the sheet situated opposite its forming cavity.

The apparatus includes a clamping member which comprises a reciprocally mounted frame having ribs joined to sides of the frame, the ribs being aligned opposite the front face of the mold between the cavities thereof.

In describing the overall invention, reference will be made to the accompanying drawings in which:

FIG. 2 is a diagrammatic view of a portion of the apparatus of FIG. 1 during an interim stage in the forming cycle;

FIG. 3 is a perspective view of a portion of the apparatus of FIG. 1;

FIG. 4 is a semi-diagrammatic view illustrating another portion of the apparatus of the invention during a stage of the cycle subsequent to that of FIG. 2; and FIG. 5 is a partial, perspective view of an alternate form of the apparatus of FIG. 3.

Figure 1:
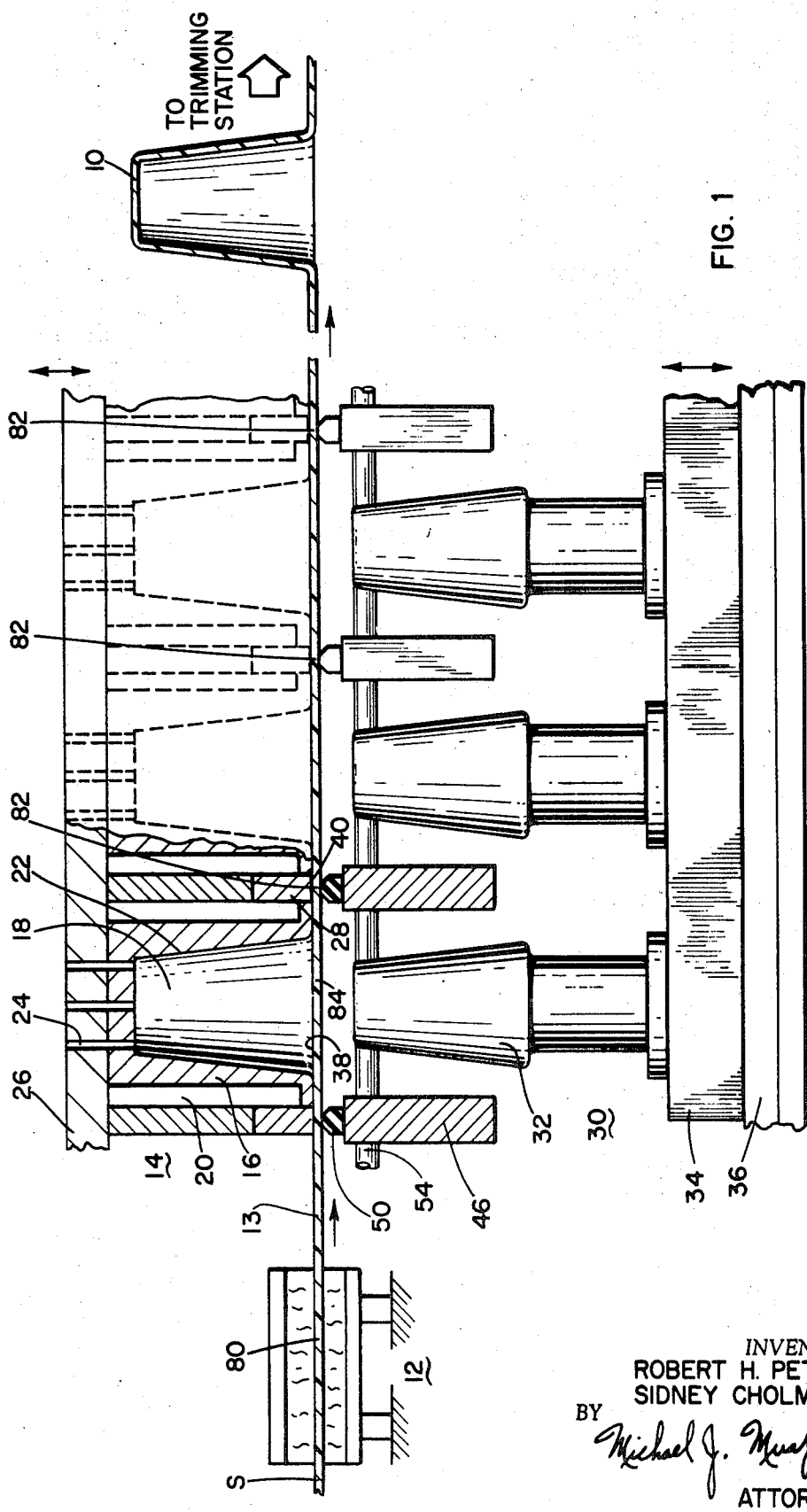
FIG. 1 is a semi-diagrammatic view, partly in section, illustrating portions of the molding apparatus of the present invention.

With reference to the drawings wherein identical numerals refer to identical parts, there is shown in FIG. 1, apparatus for repeatedly simultaneously forming a plurality of thermoplastic articles typically indicated as 10, from a generally continuous thermoplastic sheet S. This apparatus includes means 12, comprising an oven open on two sides containing heating elements, for example resistance heaters, for heating successive portions of sheet S to molding temperature. Sheet S, for example, may be rubber modified polystyrene or an acrylonitrile, butadiene, styrene polymeric material. The apparatus further includes mold means 14 comprising plural molds typically indicated as 16, each of which has a cavity 18 formed therein having a configuration generally conforming to that of the surface contour of a container. Each mold 16 further comprises one or more cooling cavities 20 outside the article defining cavities 18 through which a cooling medium may be circulated to maintain the cavity surfaces 22 at constant temperature. Each mold 16 may have a plurality of channels 24 formed in its base and/or sides for discharging air from the cavity during the forming cycle or for introducing a pressurized gas into the cavity after forming to aid in ejecting a container from its mold. Mold means 14 is adapted by conventional drive means (not shown) connected to platen 26 to be reciprocated vertically. Stripper plate 28 of mold means 14 may be separately reciprocally mounted if desired, to aid in container ejection after forming or may be an integral part of the mold block. Means 30 are provided for forcing sections of thermoplastic sheet S into the plural cavities 18 of mold means 14 as generally depicted in FIG. 2. These means comprise plugs 32 mounted on support plate 34. Each support plate 34 is mounted on platen 36, which in turn is adaped to be reciprocated vertically by means of suitably attached shafts and drive mechanisms (not shown).

As an important part of the present invention, the apparauts further includes (FIGS. 1–3) a clamping member 42 adapted to press each sheet portion involved in a plural container forming cycle against the lowermost surface 40 of stripper plate 28 between cavities 18 of mold means 14, so as to establish plural areas within the periphery of the sheet portion which are tightly clamped against the stripper plate portion of mold means 14. Clamping member 42 (FIG. 3) comprises a frame 44, the periphery of which generally conforms to the periphery of the portion of generally continuous sheet S which is indexed between the mold means and the plugs during one cycle of the apparatus. A series of sections or ribs 46, extending laterally of the direction of movement of sheet S (FIG. 1) and having a thickness generally of between about ⅛ to ½ inch, are connected to the sides 48 of clamping member 42. The spacing between ribs 46 corresponds substantially to the space between adjacent sections of stripper plate 28 on either side of a mold cavity 18 (FIG. 1). Each rib 46 may have a resilient leading or upper portion 50, for example of rubber, on the side of the clamping member which contacts the sheet. This resilient portion serves to deform and follow any irregularities in the surface of stripper plate 28 when the clamping member 42 presses the sheet against plate 28 as will be subsequently described. For highly machined platen surfaces, resilient portions 28 may be unnecessary. Optionally, the resilient surface may be provided on mold means 14 opposite ribs 42.

Clamping member 42 is mounted conventionally on a support plate (not shown) which in turn is connected to a suitable drive mechanism for reciprocable movement of the member.

Each rib 46 of clamping member 42 may have a series of spaced U-shaped grooves 52 formed in its upper end as shown partially in FIG. 3, for receiving continuous support members, for example, cables 54. These cables serve to support sheet S from sagging as it moves through apparatus during the forming cycle, particularly after leaving the heating oven. These grooves and cables are optional and are not necessary for sheet sizes of reduced width, e.g. less than about 13 inches.

In FIG. 5 is shown an optional configuration of clamping member 42 in which longitudinal sections or ribs 56 are provided in the direction of sheet travel through the apparatus, and are positioned at substantially right angles to laterally extending ribs 46. Sections 56 are spaced such that they are aligned opposite solid portions of the mold means between adjacent cavities in a manner similar to those for ribs 46.

In FIG. 4 are schematically shown additional portions of the apparatus comprising means 61 for separating each one of the plurality of articles 10 from the portion of plastic sheet S in which they are formed. Severing means 61 comprises a die section 58 and a punch 60 having a severing edge 64 designed to shear plastic material as it moves downwardly through the plastic and beyond edge 64 of die 58. Punch 60 is reciprocally mounted by suitable supporting and driving means (not shown). Generally, one severing means is provided in the plural forming apparatus for a plurality of mold cavities.

Indexing means 63 also are shown in FIG. 4 for advancing each portion of sheet S through the various succeeding stations of the apparatus, i.e. to heating means 12, molding means 14 and severing means 61. These advancing means comprise, for example, dual vertical supports 65 having bore members 66 thereon for supporting fixedly mounted shaft 68. Oscillating support 70 is journaled on shaft 68 through bushing 72 and is adapted to move laterally back and forth by suitable drive means not shown. A clamp presses sheet S against support 70, and may take the form of a pneumatically operated piston assembly 74 mounted above support 70 which has a clamp 76 on the lower end of the piston shaft 78. Support 70, of course, extends across the width of sheet S. A second piston assembly 74 and duplicate supporting arrangement is located along the opposite side of sheet S from that shown in FIG. 4.

In operation, the generally continuous thermoplastic sheet is successively indexed, one portion at a time, through heating means 12 where the sheet is brought up to molding temperature. The oven of heating means 12 is suitably sized so as to soften a portion 80 of sheet S which is of sufficient size to accommodate all of the cavities in the forming station of the apparatus. After sheet portion 80 is brought up to molding temperature, it is advanced by indexing means 63 to a position adjacent mold means 14 which already has a cooling medium circulating through cavities 20 of the various mold members 16 thereof to maintain the temperature of the surfaces of the article forming cavities substantially constant. When sheet portion 80 is in place between mold means 14 and plugs 32, clamping member 42 is caused to reciprocate upwardly against a sheet portion 80, thereby pressing it against the lower face of mold means 14, i.e. stripper plate 28, between each cavity 18 (FIG. 1) to establish plural areas 82 within the periphery of sheet portion 80 which are clamped directly to the mold means. After sheet portion 80 is thus tightly clamped, means 30 are caused to reciprocate upwardly to draw sections 84 (FIG. 2) within the clamped plural areas 82 into cavities 18 of the cooled mold means to simultaneously form the plurality of articles 10 in sheet portion 80. The stretching of the hot plastic during advance of plugs 32 into cavities 18 is generally shown in FIG. 2. The air in cavity 18 is allowed to escape through channels 24 during advance of the plugs, but some desirable billowing of the sheet occurs adjacent each clamped area 82, thus keeping the sheet away from the cooled mouth of the mold during drawing to thus avoid premature setting of the plastic. After the plugs 32 have advanced substantially completely into the cavities to partially form the containers 10, a vacuum may be drawn on each cavity through channels 24 to snap the hot plastic outwardly against the walls of the cavities and thus finally form each container. To aid in this latter finish forming step, air may be introduced through the plugs to force the plastic outwardly and off the plug surface. As can be seen from FIGS. 1 and 2, during the drawing portion of the forming cycle, each article 10 is being formed essentially completely from the portion 84 of the thermoplastic sheet S which is situated directly opposite its forming cavity 18. Thus, the pulling of portions of the sheet outside the particular clamped area for a given cavity is eliminated, and therefore improved uniformity of distribution of material amongst the plurally formed containers is obtained during a cycle. The influence of the drawing plugs 32 on the upstream portion of sheet S still inside, or just removed from heating means 12 (for example, 13 in FIG. 1) is eliminated because of the rather substantial areas 82 of clamping contact of the sheet against the face of the mold means by the laterally extending ribs 46 of clamping member 42. After the plastic has been allowed to set by contact with the coded surfaces of each cavity, the plugs, reciprocally mounted on platen 36, are caused to simultaneously move downwardly while concurrently mold means 14 reciprocates upwardly, thus leaving sheet S with the plural containers formed therein free to be advanced by indexing means 63 to trimming station 61. In trimming station 61, each container 10 is separated from sheet portion 80 by means of the shearing surfaces 62 and 64 of reciprocally mounted punch 60 and stationary die 58.

When longitudinally extending sections 56 are provided in the clamping member, sheet portion 89 is even more tightly clamped, i.e. around the entire periphery of each mold cavity 18.

Advancing support means, such as cables 54 which rest under the sheet in the forming station serve to a certain extent to replace (though they can augment) longitudinal sections 56 of the clamping member of FIG. 5.

The above description and particularly the drawings are set forth for purposes of illustration only and are not to be taken in a limited sense.

Though the invention has been described with reference to a process for forming from a generally continuous sheet of thermoplastic, it should be understood that it may be successfully used in any thermoforming operation where a plurality of articles are formed simultaneously.

The clamp of the apparatus of the present invention may be utilized with improved results in terms of uniformity of material distribution in simultaneously formed articles when plurally thermoforming any type of hollow article. Its greatest utility occurs, however, in forming relatively deep containers having a draw ratio (which is defined as the ratio of the maximum length along the axis of the container to the minimum diameter of the container) of 1 or greater. With such container configurations, the tension exerted on the sheet portion adjacent the mouth of the mold cavity is rather substantial, and its effect can be confined with the clamping technique of the present invention.

It will be understood that numerous changes may be made in the design and construction hereof without departing from the spirit and scope of the invention.

What is claimed is:
1. In the method of repeatedly simultaneously forming a plurality of deep drawn thermoplastic articles by aligning successive portions of a thermoplastic sheet in moldable condition opposite plural rows of article forming cavities of a mold means, clamping said sheet portions against the mold means and forcing sections of the clamped sheet portions into the cavities by means of advancing plugs to simultaneously at least partially form said plurality of articles, the improvement comprising clamping within the periphery of each sheet portion solely in a direction substantially perpendicular to that of advancement of the sheet such that said clamping is uninterrupted across each sheet portion intermediate each row of cavities, whereby each section of a sheet portion within a clamped area opposite one of said rows of cavities is entirely useable in forming the deep drawn containers in the cavities of said one of said rows without distorting the leading marginal area of the next successive moldable sheet portion by the advancing movement of the plugs.

2. Apparatus for repeatedly simultaneously forming a plurality of articles from a thermoplastic sheet comprising:
   (a) mold means having plural cavities with cooled surfaces formed therein, each of said cavities conforming in shape to one of said articles;
   (b) a clamping member adapted to press successive portions of said thermoplastic sheet against said mold means between the cavities thereof to establish plural areas within the periphery of each successive sheet portion which are clamped to said mold means, said clamping member comprising a reciprocatably mounted frame having laterally extending ribs joined to sides of said frame, said ribs being aligned opposite a front face of said mold means between the cavities thereof;
   (c) means for forcing sections of said clamped plural areas of said sheet portion against the cooled surfaces of said plural cavities to form and cool said articles in said sheet portion;
   (d) means for severing said articles from said sheet portion; and
   (e) means for advancing each sheet portion to said molding means and severing means.

3. The apparatus of claim 2 wherein each rib has a resilient surface extending along the leading edge thereof.

4. The apparatus of claim 2 wherein said clamping member includes longitudinally extending sections positioned at substantially right angles to said laterally extending ribs.

5. In a thermoforming apparatus for simultaneously forming a plurality of thermoplastic articles which includes mold means having a plurality of article defining cavities formed therein, means for clamping a thermoplastic sheet and means for forcing portions of the sheet into the cavities of the mold means, the improvement which comprises an integral clamping member adapted to clamp the sheet against a leading face of the mold means between the cavities thereof, said clamping member including a frame having laterally extending ribs joined to sides of said frame, said ribs being aligned opposite said leading face between the mold cavities.

6. The apparatus of claim 5 wherein the clamping member includes resilient sections which contact said sheet during clamping.

References Cited

UNITED STATES PATENTS 2,967,328  1/1961  Shelby et al.
                                  18—Sheet Clamping Dig.
3,234,310  2/1966  Edwards _____ 264—93

ROBERT F. WHITE, Primary Examiner

J. H. SILBAUGH, Assistant Examiner

U.S. Cl. X.R.

18—19; 264—92, 322